Nov. 27, 1928.
W. N. GITTINGS
1,693,293
CONTROL SYSTEM
Filed Dec. 23, 1927
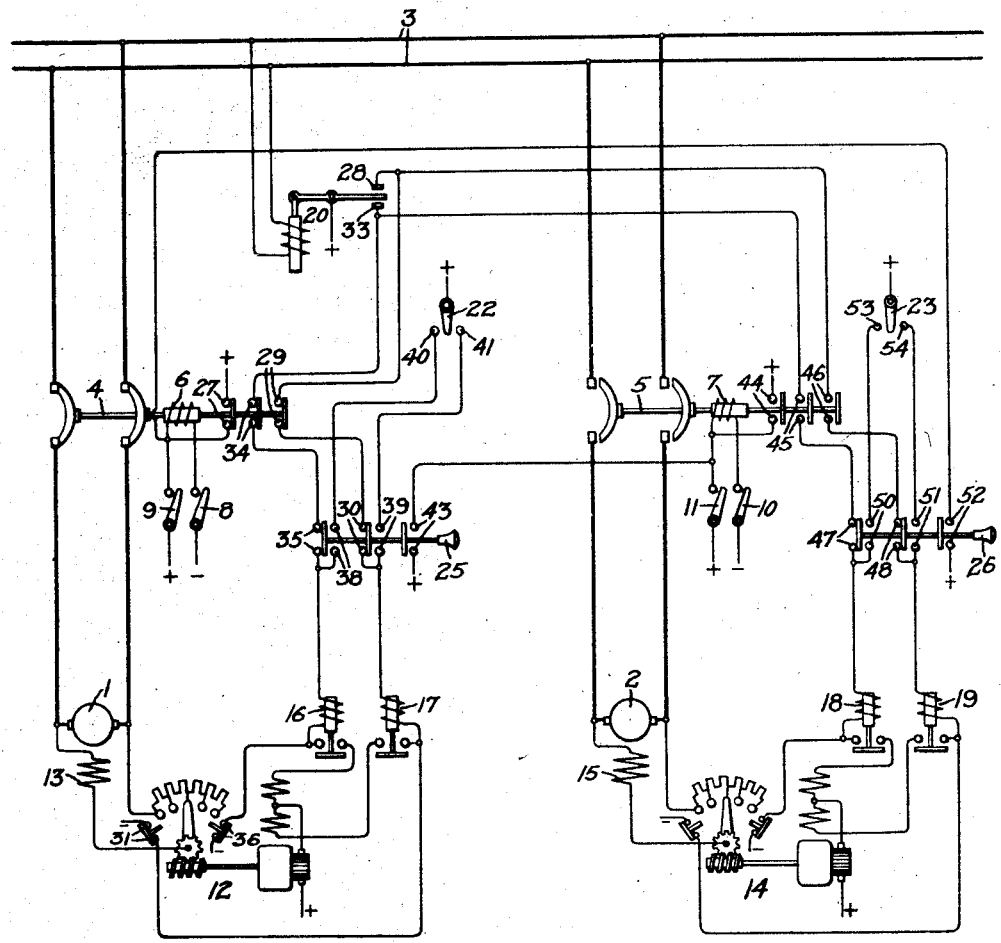
Inventor:
William N. Gittings,
by *Alexander S. Lane*
His Attorney.

Patented Nov. 27, 1928.

1,693,293

UNITED STATES PATENT OFFICE.

WILLIAM N. GITTINGS, OF SPRINGFIELD, PENNSYLVANIA, ASSIGNOR TO GENERAL ELECTRIC COMPANY, A CORPORATION OF NEW YORK.

CONTROL SYSTEM.

Application filed December 23, 1927. Serial No. 242,232.

My invention relates to control systems and particularly to a system for transferring the load of a source to another source so that the first source may be disconnected under light load conditions and its object is to provide an improved arrangement for accomplishing this result.

In systems of electric distribution it is often desirable to replace a source which is in service by another source. If the source to be taken out of service is carrying a heavy load, the disconnection thereof from the load circuit while it is carrying this heavy load may result in a disturbance on the load circuit which may be objectionable. Therefore, it is desirable first to connect the substituted source to the load circuit if it is not already connected thereto and then gradually to transfer the load being carried by the source to be disconnected, to the source to be substituted therefor. In accordance with the preferred embodiment of my invention, I provide a simple switching arrangement whereby the output of a source which is normally controlled by means responsive to a predetermined condition of the load circuit is removed from the automatic control of said device and is placed under the control of a manually controlled device and simultaneously the operation of suitable automatic switching means is effected to connect the other source to the load circuit and to place the control of the output thereof after it is connected to the load circuit under the automatic control of said control means.

My invention will be better understood from the following description taken in connection with the accompanying drawing and its scope will be pointed out in the appended claims.

In the accompanying drawing, the single Figure of which shows diagrammatically a system of distribution embodying my invention, 1 and 2 represent two suitable sources of current for supplying current to a load circuit 3. As shown the sources 1 and 2 are direct current generators which are arranged to be connected to the load circuit 3 by means of suitable switches 4 and 5 respectively, but it is obvious that my invention is not limited to any particular type of source or switching means for connecting it to the load circuit.

In order to simplify the disclosure the switches 4 and 5 are shown as of the contactor type and are provided with closing coils 6 and 7 respectively, which when energized close the respective switches and which when deenergized allow the respective switches to open. The circuit of the coil 6 includes a stopping switch 8 which has to be closed in order to complete the energizing circuit for the coil. A starting switch 9 is also provided which when closed completes an energizing circuit for the coil 6 if the stopping switch 8 is also closed. The circuit of the coil 7 includes a similar stopping switch 10 and starting switch 11.

Both of the sources 1 and 2 are provided with suitable regulating means, examples of which are well known in the art, for controlling the outputs thereof. As shown, the source 1 is provided with a motor operated rheostat 12 in the circuit of its shunt field winding 13 and the source 2 is provided with a motor operated rheostat 14 in the circuit of its shunt field winding 15.

The rheostat 12 is arranged to be moved so as to increase the resistance of the circuit of the field winding 13 when a control relay 16 associated therewith is energized and to be moved so as to decrease the resistance of the field circuit when another control relay 17 associated therewith is energized. The rheostat 14 is similarly arranged to be moved so as to increase the resistance of the circuit of the field winding 15 when a control relay 18 associated therewith is energized and to be moved so as to decrease the resistance of the field circuit when a control relay 19 associated therewith is energized.

When either source is connected to the load circuit the control relays thereof are normally controlled by a contact making voltmeter 20 which is responsive to the voltage of the load circuit, so that the excitation of the source in service is automatically varied so as to maintain the load circuit voltage constant. While I have shown a contact making voltmeter as the means for normally controlling the regulating means of a connected source, it is obvious that a control means responsive to any other suitable electrical condition of the load circuit or the output of the connected source, examples of which are well known in the art, may be used to control automatically the regulating means of the connected source.

The sources 1 and 2 are also provided with manually controlled switch devices 22 and 23 respectively for controlling the operation of the associated regulating means so that the output of the respective sources may be varied at will.

In accordance with the preferred embodiment of my invention I provide each source also with a manually controlled transfer switch which is arranged in one position to place the control relays of the associated regulating means under the control of the contact making voltmeter 20 and in another position to place the control relays under the control of the associated manually controlled switch device and to effect the connection of the other source to the load circuit. As soon as this other source is connected to the load circuit and the regulating means thereof is placed under the control of the voltmeter 20, the load may then be transferred to this other source by operating the manually controlled device associated with the source from which it is desired to remove the load. As shown in the drawing, 25 and 26 represent these manually controlled transfer switches for the sources 1 and 2 respectively.

The operation of the arrangement shown in the drawing is as follows: It will be assumed that the switch 4 is closed and source 1 is supplying current to the load circuit 2. The holding circuit for the closing coil 6 of the switch 4 is from one side of a suitable source of control current through auxiliary contacts 27 on the switch 4, closing coil 6, stopping switch 8, which is closed, to the other side of the control source. Under these conditions the regulating means 12 is normally controlled by the voltmeter 20 so that the output of the source 1 is regulated in such a manner that the load circuit voltage is maintained constant. If the load connected to the load circuit increases so that the load circuit voltage decreases to value that causes the voltmeter 20 to engage its contacts 28, a circuit is completed for the control relay 17 from one side of the control source through contact 28, auxiliary contacts 29 on switch 4, which are closed when the main contacts of the switch 4 are closed, contacts 30 of switch 25, coil of relay 17, limit switch 31 on the rheostat 12 to the other side of the control source. The energization of the control relay 17 effects the operation of the motor operated rheostat 12 so that the excitation and the output of the source 1 are increased and the voltage of the load circuit is restored to normal. If the load decreases so that the load circuit voltage increases to a value that causes the voltmeter 20 to engage its contacts 33, a circuit is completed for the control relay 16 from one side of the control source through voltmeter contacts 33, auxiliary contacts 34 on the switch 4, contacts 35 of switch 25, coil of relay 16, limit switch 36 on rheostat 12 to the other side of the control source. The energization of the control relay 16 effects the operation of the motor operated rheostat 12 to decrease the excitation and the output of the source 1 so that the load circuit voltage is restored to normal.

When it is desired to replace the source 1 by the source 2, while the source 1 is in service the transfer switch 25 is moved to its other position so that the control of the control relays 16 and 17 is removed from the control of the voltmeter 20 and is transferred to the manually controlled switch 22 and, at the same time this transfer is made, a circuit is completed for the automatic switching means associated with the source 2 to effect the connection thereof to the load circuit. The removal of the control of the relays 16 and 17 from the voltmeter 20 is effected by the opening of the contacts 35 and 30 of the switch 25. The closing of the contacts 38 and 39 of the switch 25 connects the coils of the control relays 16 and 17 to contacts 40 and 41 respectively of the manually controlled switch 22 so that, when the switch 22 is in engagement with either of these contacts, the corresponding control relay is energized.

The closing of the contacts 43 of the switch 25 in the arrangement shown completes a circuit directly for the closing coil 7 of the switch 5, but is is obvious that it may effect the operation of any other suitable automatic switching means, examples of which are well known in the art, to connect the source 2 to the load circuit. The energizing circuit of the closing coil includes the contacts 43 and the stopping switch 10 which is normally closed. The switch 5 when closed completes through its auxiliary contatcts 44 a holding circuit for the closing coil 7 so that after the switch 5 is once closed it remains closed independently of the position of the switch 25.

When the switch 5 closes, the closing of its auxiliary contacts 45 and 46 connects the coils of the control relays 18 and 19 through contacts 47 and 48 respectively of the transfer switch 26 to the voltmeter contacts 33 and 28 so that rheostat 14 is controlled in response to the voltage of the load circuit in such a manner that the output of the source is varied to maintain the load circuit voltage constant.

After the source 2 is connected to the load circuit, the switch 22 is moved into engagement with its contacts 40 so that the control relay 16 is energized to effect the operation of the rheostat 12 so as to decrease the excitation of the generator 1 and thereby gradually decrease its output and cause, in an obvious manner, the transfer of the load to the source 2.

As soon as the output of the source 1 has been decreased to a desired value, stopping switch 8 is opened so that the closing coil 6 is deenergized and the source 1 is disconnected from the load circuit.

The substitution of the source 1 for the source 2 when the latter is in service may be effected in a similar manner by operating the switch 26 so as to open its contacts 47 and 48 and close its contacts 50, 51, and 52. The opening of the contacts 47 and 48 disconnects the control relays 18 and 19 from the voltmeter contacts 33 and 28 respectively and the closing of the contacts 50 and 51 connects the relays 18 and 19 to the contacts 53 and 54 respectively associated with the manually controlled switch 23 so that these relays are under the control of the switch 23. The closing of the contacts 52 completes an energizing circuit for the automatic switching means associated with the switch 4 to effect the connection of the source 1 to the load circuit 2 and the placing of the rheostat 12 under the control of the voltmeter 20. The switch 23 is then moved into engagement with contact 53 so that the lowering control relay 18 is energized to effect a decrease in the output of the source 2. As soon as the output of source 2 has been decreased to a predetermined value stopping switch 10 is opened so that the clos ng coil 7 is deenergized and the source 2 is disconnected from the load circuit.

While I have in accordance with the patent statutes shown and described my invention as applied to a particular system and as embodying various devices diagrammatically indicated, changes and modifications will be obvious to those skilled in the art, and I therefore aim in the appended claims to cover all such changes and modications as fall within the true spirit and scope of my invention.

What I claim as new and desire to secure by Letters Patent of the United States, is,—

1. In combination, a load circuit, a source of current connected to said load circuit, regulating means for controlling the output of said source, control means responsive to a predetermined condition of the load circuit for controlling said regulating means, other control means for controlling the the operation of said regulating means to vary the output of said source, a second source of current, automatic switching means for connecting said second source to said load circuit, switching means for placing the regulating means of the first mentioned source under the control of either of said control means and for simultaneously effecting the operation of said automatic switching means to connect the other source to the load circuit when said regulating means is placed under the control of said other control means.

2. In combination, a load circuit, a source of current connected to said load circuit, regulating means for controlling the output of said source, control means responsive to a predetermined condition of the load circuit for controlling said regulating means, a switch device for controlling the operation of said regulating means to vary the output of said source, a second source of current, regulating means for controlling the output of said second source, automatic switching means for connecting said second source to the load circuit and for placing the regulating means of said second source under the control of said control means when said second source is connected to the load circuit, and a switching means arranged when in one position to place the regulating means of the first mentioned source under the control of said control means and when moved from said position to another to effect the operation of said automatic switching means to connect the other source to the load circuit and to effect the transfer of the control of the regulating means of the first mentioned source from said control device to said switch device.

3. In combination, a load circuit, a source of current connected to said circuit, regulating means for controlling the output of said source, means responsive to the voltage of said load circuit, a manually controlled switch, a second source, regulating means for controlling the output of said second source, automatic switching means for connecting said second source to said load circuit and for placing the regulating means of said second source under the control of said voltage responsive means, and a switch adapted when in one position to place the regulating means of said first mentioned source under the control of said voltage responsive means and when in another position simultaneously to place said regulating means under the control of said manually controlled switch and to effect the operation of said automatic switching means to connect the second source to the load circuit.

4. In a system for transferring load from one source to another, the combination of a load circuit, a source of current connected to said load circuit, regulating means associated with said source for controlling the output thereof comprising a plurality of control circuits, control means responsive to a predetermined electrical condition of said load circuit, a manually controlled switch, a second source, regulating means associated with said second source for controlling the output thereof, automatic switching for connecting said second source to said load circuit and to cause the regulating means associated with said second source to be operated in response to a predetermined condition of said load circuit after said second source is connected thereto, and a manually controlled switch arranged when in one position to connect said control circuits to said first mentioned control means and when in another position simultaneously to connect said control circuits to the manually controlled switch and to effect the operation of said automatic switching means.

In witness whereof, I have hereunto set my hand this twentieth day of December, 1927.

WILLIAM N. GITTINGS.